(12) United States Patent
Motoyama et al.

(10) Patent No.: US 12,545,077 B2
(45) Date of Patent: Feb. 10, 2026

(54) VEHICLE

(71) Applicant: SUBARU CORPORATION, Tokyo (JP)

(72) Inventors: Junichi Motoyama, Tokyo (JP); Kazuhiro Hayakawa, Tokyo (JP); Ryota Nakamura, Tokyo (JP); Tsukasa Mikuni, Tokyo (JP); Takuya Homma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 202 days.

(21) Appl. No.: 18/460,018

(22) Filed: Sep. 1, 2023

(65) Prior Publication Data

US 2024/0109396 A1 Apr. 4, 2024

(30) Foreign Application Priority Data

Sep. 27, 2022 (JP) .................................. 2022-154271

(51) Int. Cl.
*B60H 1/00* (2006.01)

(52) U.S. Cl.
CPC ..... *B60H 1/00742* (2013.01); *B60H 1/00285* (2013.01)

(58) Field of Classification Search
CPC ................. B60H 1/00742; B60H 1/00285
See application file for complete search history.

(56) References Cited

U.S. PATENT DOCUMENTS

| | | | |
|---|---|---|---|
| 2018/0009289 A1* | 1/2018 | Grossman | B60H 1/00742 |
| 2020/0155054 A1* | 5/2020 | Slater | A61B 5/08 |
| 2020/0156435 A1* | 5/2020 | Patil | B60H 1/00742 |
| 2020/0156649 A1* | 5/2020 | Bade | B60W 40/08 |
| 2020/0234224 A1* | 7/2020 | Hori | G06Q 10/063116 |

FOREIGN PATENT DOCUMENTS

| | | |
|---|---|---|
| JP | 2004-284450 A | 10/2004 |
| JP | 2005-335440 A | 12/2005 |

* cited by examiner

*Primary Examiner* — Peter D Nolan
*Assistant Examiner* — Mikko Okechukwu Obioha
(74) *Attorney, Agent, or Firm* — Rimon P.C.

(57) ABSTRACT

A vehicle includes an information receiver, an estimator, and a processor. The information receiver is configured to communicate with a mobile terminal of an occupant of the vehicle, and acquire information related to an action performed by the occupant outside a vehicle compartment of the vehicle. The estimator is configured to estimate a fatigue state including a fatigue degree of the occupant, based on a place identified from the acquired information related to the action. The processor is configured to execute, based on a result of estimating the fatigue state, air conditioning control including setting of a temperature and setting of an air volume on an air conditioning device configured to air condition the vehicle compartment.

12 Claims, 6 Drawing Sheets

| DATE AND TIME OF START OF STAY | DATE AND TIME OF END OF STAY | NAME OF LOCATION | POSITION INFORMATION OF LOCATION |
|---|---|---|---|
| 2022/6/30 (SAT) 10:05 | 2022/6/30 (SAT) 12:01 | GYM XX | (LATITUDE $X_{11}$, LONGITUDE $X_{i1}$) |
| 2022/6/30 (SAT) 12:20 | 2022/6/30 (SAT) 12:45 | PUBLIC BATH A | (LATITUDE $X_{12}$, LONGITUDE $X_{i2}$) |
| ... | ... | ... | ... |
| 2022/7/1 (SUN) 10:10 | 2022/7/1 (SUN) 12:15 | GYM XX | (LATITUDE $X_{11}$, LONGITUDE $X_{i1}$) |
| 2022/7/1 (SUN) 12:34 | 2022/7/1 (SUN) 13:20 | PUBLIC BATH A | (LATITUDE $X_{12}$, LONGITUDE $X_{i2}$) |
| ... | ... | ... | ... |
| 2022/7/2 (MON) 8:48 | 2022/7/2 (MON) 17:45 | BUILDING C | (LATITUDE $X_{13}$, LONGITUDE $X_{i3}$) |
| ... | ... | ... | ... |
| 2022/7/3 (TUE) 19:00 | 2022/7/3 (TUE) 21:08 | BISTRO DD | (LATITUDE $X_{14}$, LONGITUDE $X_{i4}$) |
| ... | ... | ... | ... |
| 2022/7/8 (SUN) 10:22 | 2022/7/8 (SUN) 12:37 | GYM XX | (LATITUDE $X_{11}$, LONGITUDE $X_{i1}$) |
| 2022/7/8 (SUN) 12:55 | 2022/7/8 (SUN) 14:02 | SPA E | (LATITUDE $X_{15}$, LONGITUDE $X_{i5}$) |
| ... | ... | ... | ... |
| 2022/7/9 (MON) 8:48 | 2022/7/9 (MON) 17:45 | BUILDING C | (LATITUDE $X_{13}$, LONGITUDE $X_{i3}$) |
| ... | ... | ... | ... |
| 2022/7/10 (TUE) 18:30 | 2022/7/11 (TUE) 7:51 | HOME | (LATITUDE $X_{16}$, LONGITUDE $X_{i6}$) |

VEHICLE

CROSS-REFERENCE TO RELATED APPLICATIONS

The present application claims priority from Japanese Patent Application No. 2022-154271 filed on Sep. 27, 2022, the entire contents of which are hereby incorporated by reference.

BACKGROUND

The disclosure relates to a vehicle.

A vehicle is provided with an air conditioning device that controls an environment such as a temperature in a vehicle compartment. A technique has been proposed that controls the air conditioning device depending on a fatigue state of an occupant present in the vehicle compartment.

For example, a technique has been proposed that detects a fatigue state with a sensor provided in a vehicle, and blows cleaned gas with a comfortable oxygen concentration. For example, reference is made to Japanese Unexamined Patent Application Publication (JP-A) No. 2005-335440. In addition, a technique has been proposed that detects a fatigue degree based on a heart rate, and automatically adjusts a seat temperature. For example, reference is made to JP-A No. 2004-284450.

SUMMARY

An aspect of the disclosure provides a vehicle including an information receiver, an estimator, and a processor. The information receiver is configured to communicate with a mobile terminal of an occupant of the vehicle, and acquire information related to an action performed by the occupant outside a vehicle compartment of the vehicle. The estimator is configured to estimate a fatigue state including a fatigue degree of the occupant, based on a place identified from the acquired information related to the action. The processor is configured to execute, based on a result of estimating the fatigue state, air conditioning control including setting of a temperature and setting of an air volume on an air conditioning device configured to air condition the vehicle compartment.

An aspect of the disclosure provides a vehicle including circuitry. The circuitry is configured to communicate with a mobile terminal of an occupant of the vehicle, and acquire information related to an action performed by the occupant outside a vehicle compartment of the vehicle. The circuitry is configured to estimate a fatigue state including a fatigue degree of the occupant, based on a place identified from the acquired information related to the action. The circuitry is configured to execute, based on a result of estimating the fatigue state, air conditioning control including setting of a temperature and setting of an air volume on an air conditioning device configured to air condition the vehicle compartment.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Techniques disclosed in JP-A Nos. 2005-335440 and 2004-284450 control an air conditioning device depending on a fatigue state determined based on biometric information of an occupant riding in a vehicle. The techniques do not consider a fatigue degree based on an action performed before the occupant gets in the vehicle, which can make it difficult to accurately determine the fatigue degree of the occupant when the occupant gets in the vehicle.

It is desirable to provide a vehicle that is able to control an air conditioning device depending on a fatigue degree based on an action performed by an occupant before getting in the vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Example Embodiment of Disclosure

A vehicle 1 according to an example embodiment of the disclosure is described with reference to FIGS. 1 to 6.

The vehicle 1 according to the example embodiment may acquire, from a mobile terminal 10 of an occupant riding in the vehicle 1, information related to the occupant's action performed outside a vehicle compartment, and control an air conditioning device 400 based on a fatigue degree of the occupant estimated from the acquired information related to the occupant's action.

[Configuration of Vehicle 1]

Figure 1:
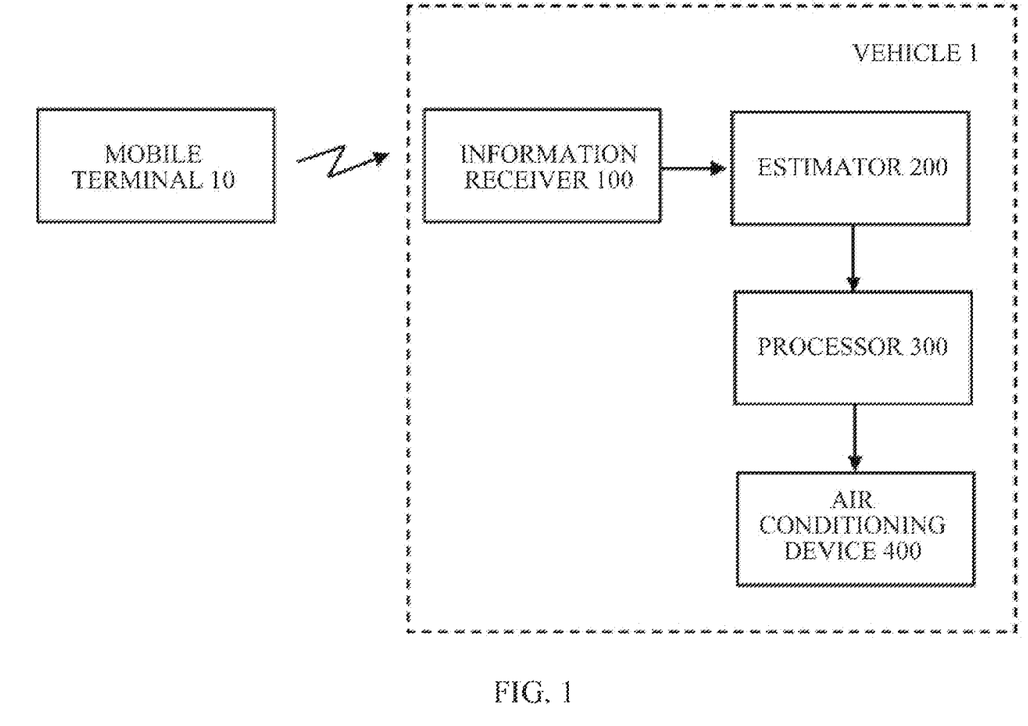
FIG. 1 is a diagram illustrating a configuration of a vehicle according to one example embodiment of the disclosure.

As illustrated in FIG. 1, the vehicle 1 according to the example embodiment may include an information receiver 100, an estimator 200, a processor 300, and the air conditioning device 400.

The information receiver 100 communicates with the mobile terminal 10 of the occupant, and acquires information related to the occupant's action performed outside the vehicle compartment.

When there are multiple occupants in the vehicle compartment, the information receiver 100 may communicate with a mobile terminal of each occupant, and acquire information related to each occupant's action performed outside the vehicle compartment.

In detail, the information receiver 100 may communicate with the mobile terminal 10 of the occupant by short-range wireless communication such as Wi-Fi or Bluetooth. The information receiver 100 may communicate with the mobile terminal 10 when an ignition key of the vehicle 1 is turned on and the vehicle 1 starts operation, or when the mobile terminal 10 is detected in the vehicle compartment of the vehicle 1 in operation.

The mobile terminal 10 may be, for example, a smartphone, a tablet terminal, or a wearable terminal carried by the occupant.

The information receiver 100 may acquire, from the mobile terminal 10, information related to the occupant's action performed outside the vehicle compartment, i.e., information related to the occupant's action performed before getting in the vehicle 1.

Figure 3:
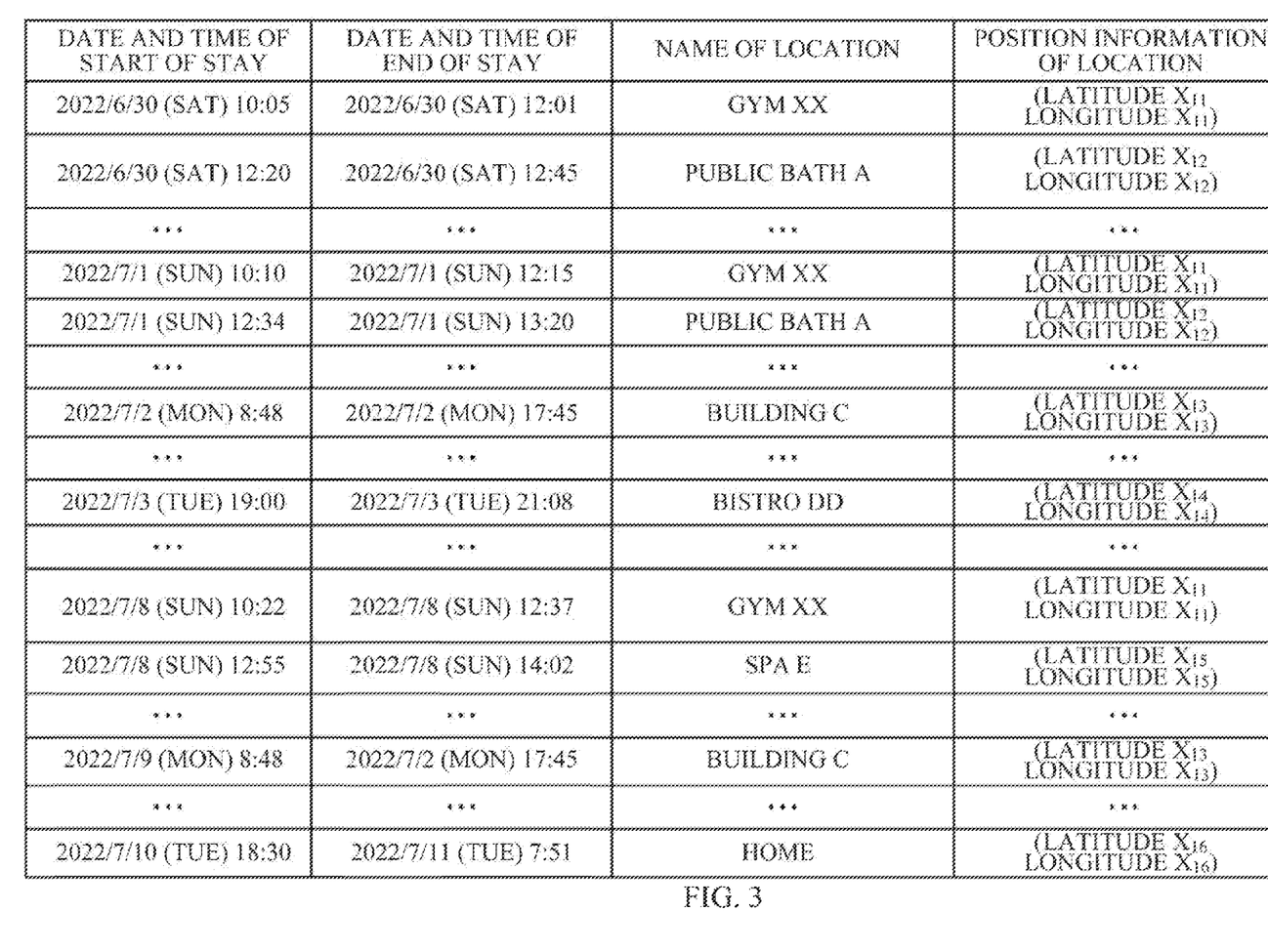
FIG. 3 is a diagram illustrating an example of information related to an occupant's action collected by an information receiver of the vehicle according to one example embodiment of the disclosure.

The information related to the occupant's action may be, for example, as illustrated in FIG. 3, a position information history including at least position information and indicating the position information at each time.

The position information may be information indicating a place where the occupant was present in the past, acquired by a global positioning system (GPS) operation of the mobile terminal 10. The position information may be indicated by a latitude and a longitude.

Note that the position information may be, for example, a name or an address of each place, without being limited to the latitude and the longitude.

The information related to the occupant's action may include acceleration rate information indicating an acceleration rate of the mobile terminal 10 resulting from the occupant's action, acquired by an acceleration rate sensor of the mobile terminal 10.

The acceleration rate information may be an acceleration rate information history indicating the acceleration rate information at each time.

The estimator 200 estimates a fatigue state including a fatigue degree of the occupant, based on the place identified from the information related to the action acquired by the information receiver 100.

In detail, the estimator 200 may first identify the place where the occupant was present, based on the position information indicated by the longitude and the latitude and acquired by the information receiver 100, for example, by referring to an unillustrated map information database provided in the vehicle 1.

The map information database may include map data such as a national road map and a road map of each region, and individual detailed information such as names and addresses of, for example, facilities and places displayed on the map.

Note that, when the position information acquired from the mobile terminal 10 is name of a place, the estimator 200 may assume that the place has already been identified, and cause the processing to proceed to the next step.

Thereafter, the estimator 200 may identify the occupant's action type, based on the detailed information of the identified place, and estimate the fatigue degree of the occupant using an algorithm prepared in advance for the identified action type.

For example, when the estimator 200 identifies a "golf course" from the acquired position information, the estimator 200 may identify that the occupant's action was "golf", and estimate the fatigue degree of the occupant who played "golf" using an algorithm prepared in advance.

When the estimator 200 identifies a "shopping center" from the acquired position information, the estimator 200 may identify that the occupant's action was "shopping", and estimate the fatigue degree of the occupant who did "shopping" using an algorithm prepared in advance.

The fatigue degree may be indicated by a level out of multiple levels, or may be indicated by a value.

When multiple pieces of position information have been acquired and the estimator 200 identifies the place where the occupant was present for each piece of the position information, the estimator 200 may estimate the fatigue degree of the occupant for each of the multiple places, and estimate a value such as an average, a sum, or an intermediate value of the determined fatigue degree as the fatigue degree of the occupant.

When the information related to the action acquired by the information receiver 100 is the position information history, the estimator 200 may calculate a stay time at the place where the occupant was present, and use the stay time for estimation of the fatigue degree.

A reason for this is that the stay time is an action amount index indicating how much the identified action type was performed, and has an influence on the fatigue degree.

For example, when the stay time is long, the action amount is large, and the estimator 200 may accordingly increase the fatigue degree estimated from the action type.

When the stay time is short, the action amount is small, and the estimator 200 may accordingly reduce the fatigue degree estimated from the action type.

The estimator 200 may also estimate a fatigue part based on the identified occupant's action type.

The estimator 200 may estimate the fatigue part using the identified occupant's action and an algorithm prepared in advance, as with estimation of the fatigue degree.

For example, a part mainly used for the identified occupant's action type may be estimated as the fatigue part. When the occupant's action type is "golf", the fatigue part may be estimated to be "legs" and "arms".

Furthermore, when the information related to the action acquired by the information receiver 100 includes the acceleration rate information, the estimator 200 may identify whether the occupant was stopped, walking, or running, based on the acceleration rate information, and use the identified information for estimation of the fatigue degree of the occupant.

In detail, the estimator 200 may first identify whether the occupant was stopped, walking, or running, by comparing the acceleration rate information with a lower limit threshold of the acceleration rate for determining that the occupant was walking and a lower limit threshold of the acceleration rate for determining that the occupant was running.

Thereafter, the estimator 200 may correct the fatigue degree estimated from the action type, depending on whether the occupant was stopped, walking, or running.

A reason for this is that whether the occupant was stopped, walking, or running has an influence on the action amount regarding the identified action type.

In one example, the action amount increases in the order of stopped, walking, and running, and the estimator 200 may accordingly increase the fatigue degree estimated from the action type in the order of stopped, walking, and running.

Note that the estimator 200 may calculate the number of steps taken by the occupant from the acceleration rate information, and correct the fatigue degree estimated from the action type depending on the number of steps.

The processor 300 executes, based on a result of the estimation by the estimator 200, air conditioning control including setting of a temperature and setting of an air volume on the air conditioning device 400 in the vehicle compartment.

In detail, the processor 300 may instruct the air conditioning device 400 to be described later about the setting of the temperature and the setting of the air volume of the air conditioning, based on the fatigue degree estimated by the estimator 200 and a preset algorithm.

When fatigue degrees of multiple occupants in the vehicle compartment are estimated, the processor 300 may execute the air conditioning control including the setting of the temperature and the setting of the air volume on the air conditioning device 400 in the vehicle compartment, based on an intermediate value or an average of the fatigue degrees of the multiple occupants.

For example, to cool down the occupant when the fatigue degree of the occupant is at a high level, the processor 300 may set the temperature of the air conditioning device 400 low, for example, to 20° C., and set the air volume to an outputtable maximum air volume.

As the fatigue degree becomes lower in level, it becomes less necessary to cool down the occupant, and the processor 300 may accordingly perform control of increasing the temperature setting of the air conditioning and reducing the air volume.

When the fatigue part is estimated by the estimator 200, the processor 300 may perform setting of an airflow direction to direct air to the fatigue part.

For example, the processor 300 may perform the setting of the airflow direction to direct air to the body when the fatigue part is the body, and to the legs when the fatigue part is the legs.

When there are multiple fatigue parts, the processor 300 may, for example, perform the setting of the airflow direction to direct air sequentially based on a preset order.

The processor 300 may also determine whether to direct hot air or cold air to the fatigue part, based on the fatigue degree.

The processor 300 may, for example, perform setting to direct cold air to cool the fatigue part when the fatigue degree is at a high level, and direct hot air to heat the fatigue part when the fatigue degree is at a low level, as with the temperature setting of the air conditioning.

Figure 6:
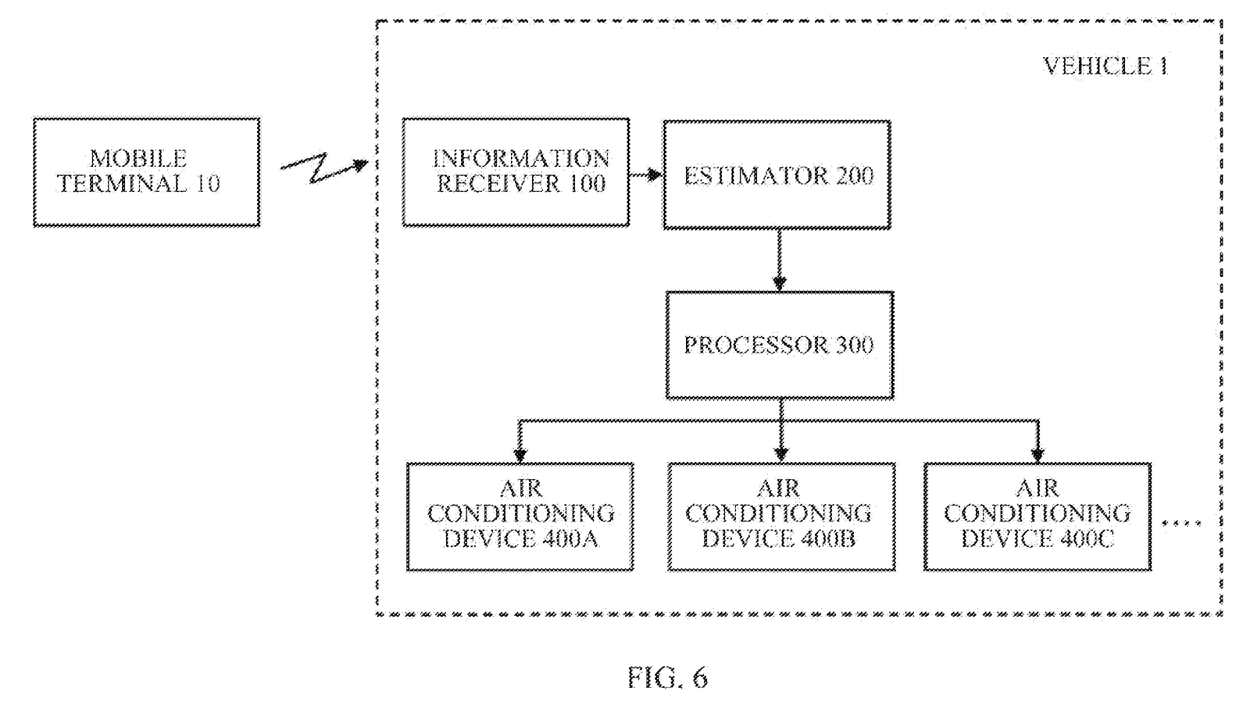
FIG. 6 is a diagram illustrating a configuration of the vehicle according to one example embodiment of the disclosure.

Note that, as the air conditioning device 400, multiple air conditioning devices 400 (400A, 400B, 400C, etc.) may be provided for each of seats in the vehicle compartment, as illustrated in FIG. 6.

In this case, when multiple occupants are present in the vehicle compartment, the processor 300 may individually control the air conditioning devices 400 (400A, 400B, 400C, etc.) provided for each of the seats in the vehicle compartment, and control the temperature of the air conditioning device 400 for the occupant having a low fatigue degree. The processor 300 may thus adjust the temperature in the vehicle compartment to an appropriate temperature.

In detail, for example, when the fatigue degree estimated for each of the occupants in the vehicle differs in level, the processor 300 may cause low-temperature air to be blown from the air conditioning device 400 for the seat where the occupant estimated to have a high fatigue degree is seated, to reduce the fatigue degree of the occupant.

From the air conditioning device 400 for the seat where the occupant estimated to have a not so high fatigue degree is seated, the processor 300 may cause air with a reduced air volume and a not so high setting temperature to be blown. The processor 300 may thus adjust the temperature in the entire vehicle compartment to an appropriate temperature.

The air conditioning device 400 may be, for example, an air conditioner. The air conditioning device 400 may have operation modes including a cooling mode, a heating mode, a dehumidifying mode, etc., and may control, for example, the temperature in the vehicle compartment.

The air conditioning device 400 may control the temperature, the air volume, and the airflow direction, in accordance with control of parameters including the temperature, the air volume, and the airflow direction by the processor 300.

Furthermore, for the air conditioning devices 400A, 400B, 400C, etc. provided for each seat, the processor 300 may set the parameters including the temperature, the air volume, and the airflow direction controlled for each of the occupant.

In one example, depending on the fatigue degree of each occupant, the processor 300 may set the parameters, for example, the temperature, the air volume, a body part of the occupant not to be directly hit by air, and a body part to be directly hit by air, for the air conditioning devices 400 (400A, 400B, 400C, etc.), to control the air conditioning devices 400.

[Processing by Vehicle 1]

Processing by the vehicle 1 according to the example embodiment is described with reference to FIGS. 2 to 6.

Figure 2:
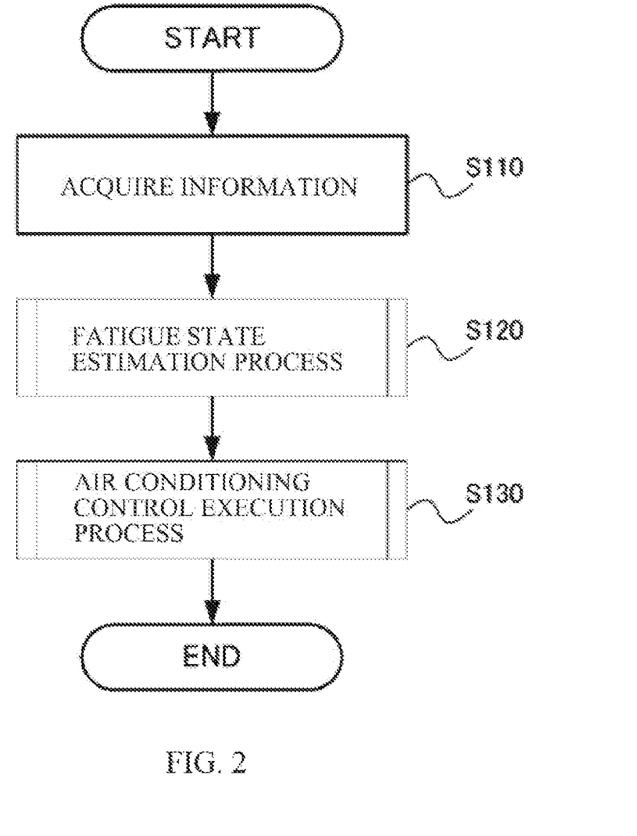
FIG. 2 is a diagram illustrating a processing flow of the vehicle according to one example embodiment of the disclosure.

As illustrated in FIG. 2, the information receiver 100 may communicate with the mobile terminal 10 of the occupant, and acquire information related to the occupant's action.

In one example, the information receiver 100 may acquire a date and time of a start of stay, a date and time of an end of stay, a name of a location, and position information of a location illustrated in FIG. 3 and unillustrated acceleration rate information, as the information related to the occupant's action from the mobile terminal 10 (step S110).

The estimator 200 may estimate the place where the occupant stayed before getting in the vehicle, based on the information related to the occupant's action acquired from the information receiver 100, estimate the occupant's action performed before getting in the vehicle, and estimate the fatigue state of the occupant from the estimated occupant's action (step S120).

Figure 4:
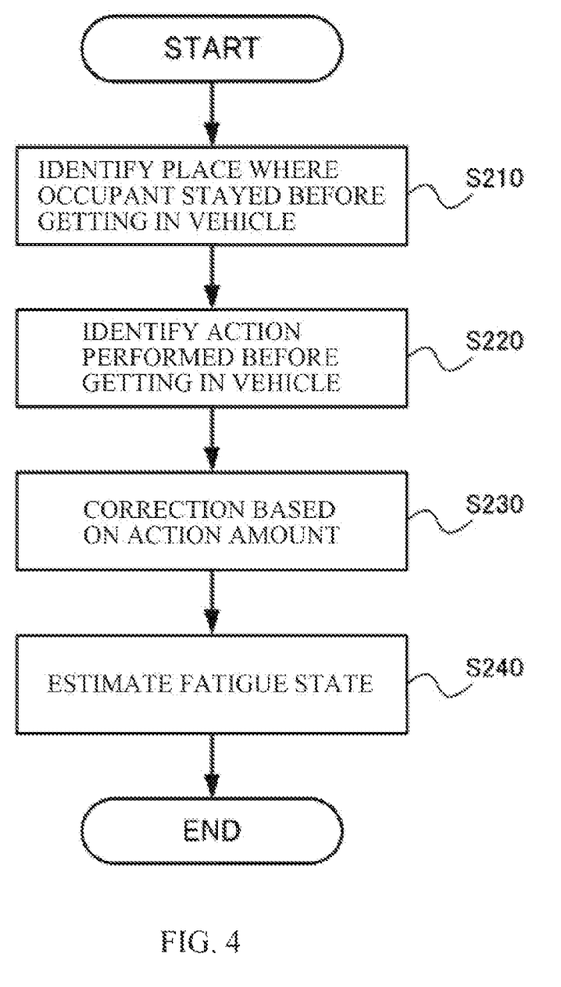
FIG. 4 is a diagram illustrating a processing flow of estimating a fatigue state of the occupant according to one example embodiment of the disclosure.

In detail, as illustrated in FIG. 4, the estimator 200 may identify the place where the occupant stayed, based on latitude and longitude information of the position information where the occupant stayed before getting in the vehicle and the map information (step S210), and identify the occupant's action assumed from the identified stay place (step S220).

Thereafter, the estimator 200 may correct the estimated fatigue state, in further consideration of the action amount in addition to the fatigue state estimated based on the action. The action amount may be identified considering, for example, the fatigue degree, the fatigue part, and the number of steps at the stay place, based on the stay time and the acceleration rate information acquired from the occupant (step S230).

Furthermore, considering these pieces of information together, the estimator 200 may estimate the final fatigue state of the occupant (S240).

The processor 300 may execute control on the air conditioning device 400, based on the fatigue state of the occupant estimated by the estimator 200 (S130), to adjust the temperature in the vehicle compartment to an appropriate temperature, and execute the air conditioning by the air conditioning device 400.

Figure 5:
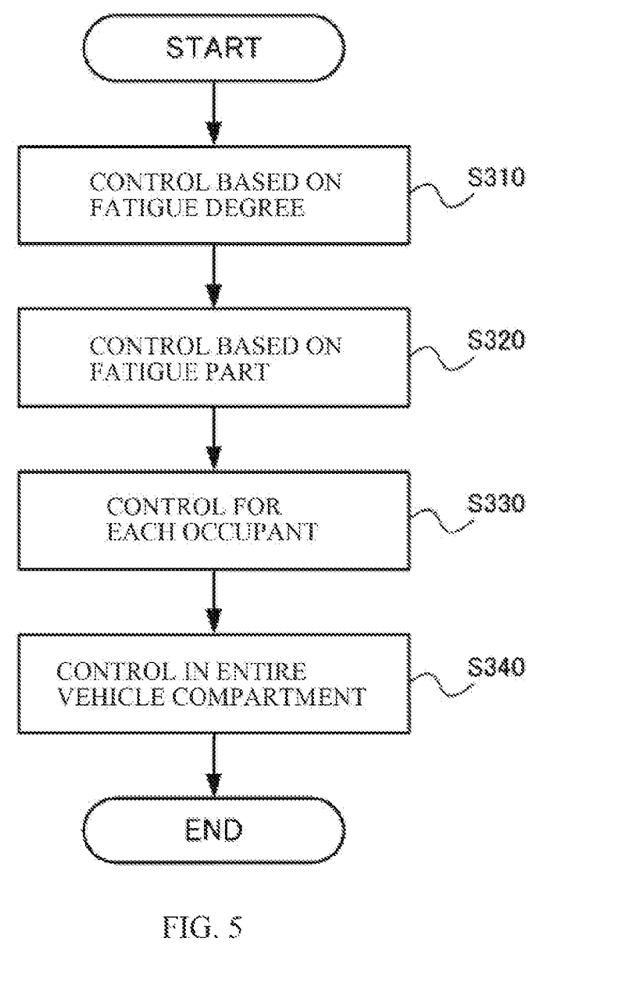
FIG. 5 is a diagram illustrating a processing flow of executing control of an air conditioning device according to one example embodiment of the disclosure.

In detail, as illustrated in FIG. 5, the processor 300 may execute, based on the estimated fatigue degree of the occupant and a preset algorithm, the air conditioning control including setting of the temperature and setting of the air volume on the air conditioning device 400 in the vehicle compartment (step S310).

The processor 300 may also execute, based on the estimated fatigue part of the occupant and a preset algorithm, the air conditioning control including setting of the temperature and setting of the air volume on the air conditioning device 400 in the vehicle compartment (step S320).

Furthermore, when multiple occupants are riding in the vehicle compartment, the processor 300 may execute, based on the estimated fatigue degree of each occupant and a preset algorithm, the air conditioning control including setting of the temperature and setting of the air volume on the individual air conditioning devices 400 (400A, 400B, 400C, etc.) installed for each occupant in the vehicle compartment, as illustrated in FIG. 6 (step S330).

Based on these pieces of information, the processor 300 may finally control the air conditioning device 400 in the vehicle compartment to keep the temperature in the entire vehicle compartment at an appropriate temperature (step S340).

Workings and Effects

As described above, the information receiver 100 of the vehicle 1 according to the example embodiment acquires information related to the action performed by the occupant before getting in the vehicle from the mobile terminal 10 of the occupant. The estimator 200 estimates the fatigue state including the fatigue degree of the occupant, based on the place identified from the information related to the occupant's action. The processor 300 executes, based on a result of estimating the fatigue state of the occupant by the estimator 200, the air conditioning control including setting of the temperature and setting of the air volume of the air conditioning on the air conditioning device 400 in the vehicle compartment.

In other words, the place where the occupant is assumed to have stayed before getting in the vehicle is identified, from the occupant's action information before getting in the vehicle acquired from the mobile terminal carried by the occupant. Thus, the action performed by the occupant is estimated from the identified place, and the fatigue state of the occupant is estimated based on the action. Based on the result of estimating the fatigue state of the occupant, appropriate air conditioning control suitable for the estimated fatigue state is executed, regarding the temperature and the air volume of the air conditioning in the vehicle compartment.

This makes it possible to execute appropriate air conditioning in the vehicle compartment suitable for the fatigue state of the occupant, corresponding to the result of estimating the fatigue state based on the action performed before getting in the vehicle, using vehicle equipment installed in an existing vehicle and the occupant's action information before getting in the vehicle, without mounting new vehicle equipment. This allows for air conditioning in the vehicle compartment comfortable for the occupant.

The estimator 200 of the vehicle 1 according to the example embodiment may estimate the fatigue part of the occupant, based on the place identified from the information related to the occupant's action. The processor 300 may execute, based on a result of estimating the fatigue part of the occupant by the estimator 200, the air conditioning control including setting of the airflow direction of the air conditioning on the air conditioning device 400 in the vehicle compartment.

In other words, the place where the occupant is assumed to have stayed before getting in the vehicle is identified, from the occupant's action information before getting in the vehicle acquired from the mobile terminal carried by the occupant. Thus, the action performed by the occupant is estimated from the identified place, and the fatigue part of the occupant is estimated based on the action. For example, when the identified place is a "golf course", the action performed by the occupant may be estimated to be "played golf", the body part mainly used when the occupant "played golf" may be estimated as the fatigue part, and the fatigue part may be estimated to be "legs" and "arms". Based on the result of estimating the fatigue part of the occupant, appropriate air conditioning control assuming the estimated fatigue part may be executed, regarding the airflow direction of the air conditioning in the vehicle compartment.

This makes it possible to execute the air conditioning in the vehicle compartment in an appropriate airflow direction suitable for the fatigue part of the occupant, corresponding to the result of estimating the fatigue part based on the action performed before getting in the vehicle, using vehicle equipment installed in an existing vehicle and the occupant's action information before getting in the vehicle, without mounting new vehicle equipment. This makes it possible to help recovery of the fatigue part of the occupant, which allows for comfortable air conditioning in the vehicle compartment.

When multiple occupants are present in the vehicle compartment of the vehicle 1 according to the example embodiment, the processor 300 may individually control the air conditioning device 400 provided for each of the seats in the vehicle compartment, and control the temperature of the air conditioning device 400 for the occupant of which the fatigue degree is low.

In other words, the air conditioning device 400 provided for each of the seats in the vehicle compartment may be individually controlled, and the temperature of the air conditioning device 400 for the occupant having a low fatigue degree may be controlled. Thus, the air conditioning control of the air conditioning device 400 may be executed to adjust the temperature in the entire vehicle compartment to an appropriate temperature, while executing individual control such as further reducing the air conditioning temperature or further increasing the air volume for the air conditioning device 400 for the occupant having a high fatigue degree.

This makes it possible to execute appropriate air conditioning control suitable for the fatigue state of each individual occupant of the multiple occupants, corresponding to the result of estimating the fatigue state based on the action performed before getting in the vehicle. This makes it possible to adjust the air conditioning in the entire vehicle compartment, while executing air conditioning control that allows for earlier recovery of the fatigue degree for the occupant having a high fatigue degree. This allows for air conditioning in the vehicle compartment comfortable for the occupant.

Furthermore, the information receiver 100 of the vehicle 1 according to the example embodiment may acquire, from the mobile terminal 10 of the occupant, information related to the occupant's action performed before getting in the vehicle. The estimator 200 may estimate the fatigue state of the occupant, in consideration of the action amount of the occupant identified from the information related to the occupant's action.

In other words, consideration may be given to the action amount of the action performed by the occupant before getting in the vehicle, identified from the occupant's action information before getting in the vehicle acquired from the mobile terminal carried by the occupant. Thus, the estimator 200 may estimate a more accurate fatigue state of the occupant, and execute, based on a result of the estimation, appropriate air conditioning control suitable for the estimated fatigue state, regarding the temperature and the air volume of the air conditioning in the vehicle compartment.

This makes it possible to execute further appropriate air conditioning in the vehicle compartment suitable for the fatigue state of the occupant, corresponding to the result of estimating the more accurate fatigue state based on the action performed before getting in the vehicle. This allows for air conditioning in the vehicle compartment further comfortable for the occupant.

Modification Example 1

The vehicle 1 may also acquire information acquirable from various sensors mounted on the mobile terminal 10, as the information related to the occupant's action acquired from the mobile terminal 10 of the occupant. Examples of the information acquirable from various sensors may include angular speed information acquired from a gyro sensor, atmospheric pressure information obtained by an atmospheric pressure sensor, air temperature information obtained by an air temperature sensor, magnetic field information obtained by a magnetic sensor, and image information obtained by an image sensor. When the mobile terminal 10 is a wearable device, the vehicle 1 may also acquire biometric information such as a heart rate or a body temperature, as the information related to the occupant's action. Based on such information, the estimator 200 may estimate the fatigue state of the occupant, and the processor 300 may control the air conditioning device 400.

In other words, the information related to the occupant's action may be acquired using information not limited to, for example, the position information of the occupant before getting in the vehicle. The estimator 200 may thus estimate the fatigue state of the occupant, and the processor 300 may control the air conditioning device 400.

In one example, information including a combination of angular speed information of a gyro sensor and magnetic field information of a magnetic sensor, each acquired from the mobile terminal 10 of the occupant before getting in the vehicle, may be used. By comparing such information with information on a normal action, it is possible to more accurately grasp the accuracy of the action information, regarding whether the occupant's action performed before getting in the vehicle was an intense action. This makes it possible to more accurately estimate the fatigue state.

Furthermore, it is possible to more accurately grasp an environment of the place where the occupant stayed before getting in the vehicle, based on information including a combination of atmospheric pressure information of an atmospheric pressure sensor, air temperature information of an air temperature sensor, and image information of an image sensor, each acquired from the mobile terminal 10 of the occupant before getting in the vehicle. For example, it is possible to also estimate a case where the occupant performed an action in a hot environment, and a case where the occupant performed an action in a mountainous region with a low atmospheric pressure. This makes it possible to estimate a more accurate fatigue state taking such cases in consideration.

When the mobile terminal 10 is a wearable device, it is possible to consider biometric information such as a heart rate or a body temperature of the occupant before getting in the vehicle, in addition to the action amount of the occupant, which makes it possible to estimate a more accurate fatigue state.

As described above, the fatigue state of the occupant may be more accurately estimated based on information such as direct vital information of the occupant or surrounding environment information, using various operations of an existing mobile terminal, without mounting new vehicle equipment. This makes it possible to control air conditioning equipment based on various pieces of information. This allows for air conditioning in the vehicle compartment more comfortable for the occupant.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In some embodiments, it is possible to implement the vehicle 1 of the example embodiment of the disclosure by recording the process to be executed by components including the estimator 200 and the processor 300 on a non-transitory recording medium readable by a computer system, and causing the computer system to load the program recorded on the non-transitory recording medium onto the components including the estimator 200 and the processor 300 to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Each of the estimator 200 and the processor 300 illustrated in FIGS. 1 and 6 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the estimator 200 and the processor 300. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the estimator 200 and the processor 300 illustrated in FIGS. 1 and 6.

The invention claimed is:

1. A vehicle comprising:
an information receiver configured to communicate with a mobile terminal of an occupant of the vehicle, and acquire, from the mobile terminal, actual location information acquired from a positioning function of the mobile terminal, the location information indicating a place visited by the occupant before getting in the vehicle;
an estimator configured to:
identify the place visited by the occupant based on the acquired actual location information;
determine a type of action performed at the identified place by the occupant, based on information associated with the identified place; and
estimate a fatigue state comprising a fatigue degree of the occupant based on the determined type of action; and
a processor configured to execute, based on the estimated fatigue state, air conditioning control comprising setting of a temperature and setting of an air volume on an air conditioning device configured to perform air conditioning of a vehicle compartment.

2. The vehicle according to claim 1, wherein
the estimator is configured to estimate a fatigue part of the occupant based on the determined type of action, and
the processor is configured to control setting of an airflow direction of the air conditioning device to direct air to the estimated fatigue part of the occupant.

3. The vehicle according to claim 2, wherein
the air conditioning device is provided for each of seats in the vehicle compartment, and
the processor is configured to, when multiple occupants are present in the vehicle compartment, individually control the air conditioning device provided for each of the seats in the vehicle compartment, and control the setting of the temperature of the air conditioning device provided for the seat of one of the occupants the fatigue degree of whom is low.

4. The vehicle according to claim 1, wherein
the air conditioning device is provided for each of seats in the vehicle compartment, and the processor is configured to, when multiple occupants are present in the vehicle compartment, individually control the air conditioning device provided for each of the seats in the vehicle compartment, and control the setting of the temperature of the air conditioning device provided for the seat of one of the occupants the fatigue degree of whom is low.

5. The vehicle according to claim 1, wherein the estimator is configured to estimate the fatigue state in consideration of an action amount identified from the acquired information related to the action.

6. The vehicle according to claim 1, wherein the estimator is further configured to estimate the fatigue degree based on a duration of stay at the visited place.

7. The vehicle according to claim 1, wherein the estimator is further configured to estimate the fatigue state based on acceleration rate information acquired from the mobile terminal, in addition to the determined type of action.

8. The vehicle according to claim 7, wherein the estimator is further configured to estimate the fatigue degree based on an acceleration pattern identified from the acquired acceleration rate information.

9. The vehicle according to claim 7, wherein the estimator is configured to correct the estimated fatigue degree depending on whether the occupant was stopped, walking, or running, as identified from the acceleration rate information acquired from the mobile terminal.

10. The vehicle according to claim 7, wherein the estimator is configured to calculate the number of steps taken by the occupant from the acceleration rate information acquired from the mobile terminal and correct the estimated fatigue degree according to the number of steps.

11. The vehicle according to claim 1, wherein the estimator is further configured to estimate the fatigue state based on at least one of angular speed information, atmospheric pressure information, air temperature information, magnetic field information, or image information acquired from the mobile terminal, or biometric information including a heart rate or body temperature acquired from a wearable device worn by the occupant.

12. A vehicle comprising circuitry configured to:
communicate with a mobile terminal of an occupant of the vehicle, and acquire, from the mobile terminal, actual location information acquired from a positioning function of the mobile terminal, the location information indicating a place visited by the occupant before getting in the vehicle;
identify the place visited by the occupant based on the acquired actual location information;
determine a type of action performed at the identified place by the occupant, based on information associated with the identified place; and
estimate a fatigue state comprising a fatigue degree of the occupant based on the determined type of action; and
execute, based on the estimated fatigue state, air conditioning control comprising setting of a temperature and setting of an air volume on an air conditioning device configured to perform air conditioning of a vehicle compartment.

* * * * *